(12) United States Patent
VanDenberg et al.

(10) Patent No.: US 7,758,056 B2
(45) Date of Patent: Jul. 20, 2010

(54) SUSPENSION ASSEMBLY WITH COAXIAL TORSION BAR

(75) Inventors: Ervin K. VanDenberg, Massillon, OH (US); David H. Croston, Navarre, OH (US)

(73) Assignee: Air Suspensions, Inc., Massillon, OH (US)

( * ) Notice: Subject to any disclaimer, the term of this patent is extended or adjusted under 35 U.S.C. 154(b) by 0 days.

(21) Appl. No.: 12/117,283

(22) Filed: May 8, 2008

(65) Prior Publication Data

US 2009/0278328 A1 Nov. 12, 2009

(51) Int. Cl.
*B60G 3/12* (2006.01)
(52) U.S. Cl. .......................... 280/124.128; 280/124.11; 280/124.116; 280/124.153; 280/124.166; 280/124.177; 267/188; 267/189
(58) Field of Classification Search ................ 280/86.5, 280/124.116, 124.128, 124.157, 124.162, 280/124.164–124.166, 124.177; 267/64.24, 267/64.19, 64.23, 189, 256–258
See application file for complete search history.

(56) References Cited

U.S. PATENT DOCUMENTS

| | | | |
|---|---|---|---|
| 2,998,981 A | 9/1961 | Derr | |
| 3,078,104 A * | 2/1963 | Chalmers | 280/124.132 |
| 3,140,880 A * | 7/1964 | Masser | 280/124.108 |
| 3,784,221 A | 1/1974 | Frasier, Sr. | |
| 4,171,830 A | 10/1979 | Metz | |
| 4,966,386 A | 10/1990 | Werdich | |
| 5,161,814 A | 11/1992 | Walker | |
| 5,163,701 A | 11/1992 | Cromley, Jr. | |
| 5,215,328 A | 6/1993 | Bono et al. | |
| 5,277,450 A * | 1/1994 | Henschen | 280/6.151 |
| 5,366,237 A | 11/1994 | Dilling et al. | |
| 5,411,268 A * | 5/1995 | Nelson et al. | 273/292 |
| 5,427,404 A | 6/1995 | Stephens | |
| 5,505,481 A | 4/1996 | VanDenberg et al. | |
| 5,505,482 A | 4/1996 | VanDenberg et al. | |
| 5,540,454 A | 7/1996 | VanDenberg et al. | |
| 5,683,098 A | 11/1997 | VanDenberg et al. | |
| 5,690,353 A | 11/1997 | Vandenberg | |
| 5,718,445 A | 2/1998 | VanDenberg | |
| 5,788,263 A | 8/1998 | VanDenberg | |
| 5,820,156 A | 10/1998 | VanDenberg | |
| 5,853,183 A | 12/1998 | VanDenberg | |
| 5,924,712 A * | 7/1999 | Pierce | 280/124.13 |

(Continued)

*Primary Examiner*—Paul N Dickson
*Assistant Examiner*—James English
(74) *Attorney, Agent, or Firm*—Sand & Sebolt

(57) ABSTRACT

A vehicle suspension system includes a pair of suspension assemblies mounted on a pair of spaced vehicle frame members for supporting a vehicle body on the vehicle wheels. A torsion axle extends between the pair of suspension assemblies and terminates in a pair of stub shafts. The axle is mounted on a pair of spaced frame bars attached to the vehicle frame. An air spring extends between the vehicle frame and an outer end of a support arm mounted on the torsion axle. The stub shafts are supported within an outer tube of the torsion axle by a plurality of elastomeric members. One end of each stub shaft is connected to a spindle arm which has a spindle extending from an opposite end of the arm. The outer tube of the torsion axle pivotally supports the air spring support arm and the axis of the torsion axle is coaxial with the pivot axis of the air spring support arm to provide a more compact and sturdy suspension assembly.

19 Claims, 10 Drawing Sheets

U.S. PATENT DOCUMENTS 6,340,165 B1 1/2002 Kelderman
7,077,410 B2 * 7/2006 Gregg et al. ........... 280/124.13
7,516,821 B2 * 4/2009 Powers ................... 188/18 A
2004/0188973 A1 * 9/2004 Molitor ............... 280/124.166

* cited by examiner

SUSPENSION ASSEMBLY WITH COAXIAL TORSION BAR

BACKGROUND OF THE INVENTION

1. Technical Field

The invention relates to suspension systems for vehicles, such as trailers and trucks. More particularly, the invention relates to a suspension assembly having a torsion axle in combination with an air spring. Even more particularly, the invention relates to a suspension assembly in which the axis of the torsion axle is coaxial with the pivot axis of the air spring support arm.

2. Background Information

Torsion axles have been known for many years, such as shown in U.S. Pat. No. 2,998,981. Torsion axles have proven to be extremely popular because if one wheel hits a bump or rut, it can react independently of the other wheel, which may not have hit a bump or rut at the same time. This torsion axle concept operates to keep a trailer moving as straight as possible behind a towing vehicle and absorbs some of the shock of the road over which it is passing with an independent suspension. This is contrasted with a straight axle where if one wheel drops into a rut or is slowed down for any reason while the other wheel of the trailer does not have the same experience at the same time, the trailer would tend to turn somewhat to allow the wheel that is on the flat part of the road to move forward while the wheel that is in the rut is restrained, therefore causing the axle not to be perpendicular with the direction of towing of the vehicle itself.

Torsion axles are constructed of a square axle in cross section with elongated rubber members disposed in-between the square axle and a larger outer tube. U.S. Pat. Nos. 5,161,814 and 5,820,156 disclose such a construction. One common torsion axle is a TorFlex® rubber torsion suspension system distributed by Dexter Axle. This type of torsion axle has independent and separate stub axles on each end which are part of spaced suspension assemblies mounting each of the wheels on the trailer frame to enhance the independent aspect of such an axle.

Torsion axles can also be constructed as in U.S. Pat. No. 5,163,701 which uses a plurality of elongated bars which can twist and bend but return to their original position after such bending. It is also known to use air bags for straight, non-torsion axles, such as shown in U.S. Pat. Nos. 3,784,221 and 5,427,404. While it is true that both the torsion axle technology and the air bag technology has been quite successful independently in making a smoother ride and enhanced the handling performances of vehicles having such suspension systems, these suspension systems still have their shortcomings and there is a need for improvement thereto.

The vehicle suspension system of U.S. Pat. No. 6,340,165 combines the advantage of both the torsion axle and air spring into a single suspension assembly and has provided a more efficient and better performing suspension system than that believed provided by the systems using only a torsion axle or only an air spring.

The suspension assembly of the present invention improves on the system of U.S. Pat. No. 6,340,165 by providing a more rugged and compact structure by combining the pivot for both the torsion axle and connected spindle arm and the air spring mounting arm on a common axis.

BRIEF SUMMARY OF THE INVENTION

The present invention relates to a vehicle suspension assembly for attachment to a vehicle frame having a torsion axle and at least two ground engaging wheels operatively rotatably attached to each respective end of the torsion axle. A frame attachment arm is adapted to be attached to the vehicle frame and has an air spring mounting arm operably pivotally attached to the frame attachment arm along an axis. A torsion axle is received in an axle receiving portion of the air spring mounting arm and attachment frame bar and extends coaxially with the pivot axis of the air spring mounting arm. The air spring is operatively disposed between the frame bar and the mounting arm and is spaced from the coaxial axis. A spindle arm is operably attached to the outer end of the torsion axle and has a wheel spindle extending outwardly from a distal end of the spindle arm generally aligned with the air spring.

Thus, in accordance with one of the main features of the present invention, the vehicle suspension assembly provides a compact, sturdy construction which is adapted to be secured to the vehicle frame and supports one end of a torsion axle which extends across the vehicle between the spaced vehicle wheels and has a stub shaft pivotally mounted by elastomeric members within the interior of the torsion axle at each end of the axle, which stub shaft is attached at an outer end to a spindle arm and which has an air spring extending between the frame mounting bar and the distal end of a mounting lever which is pivotally attached to the frame bar and torsion axis and is coaxial therewith.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 3:
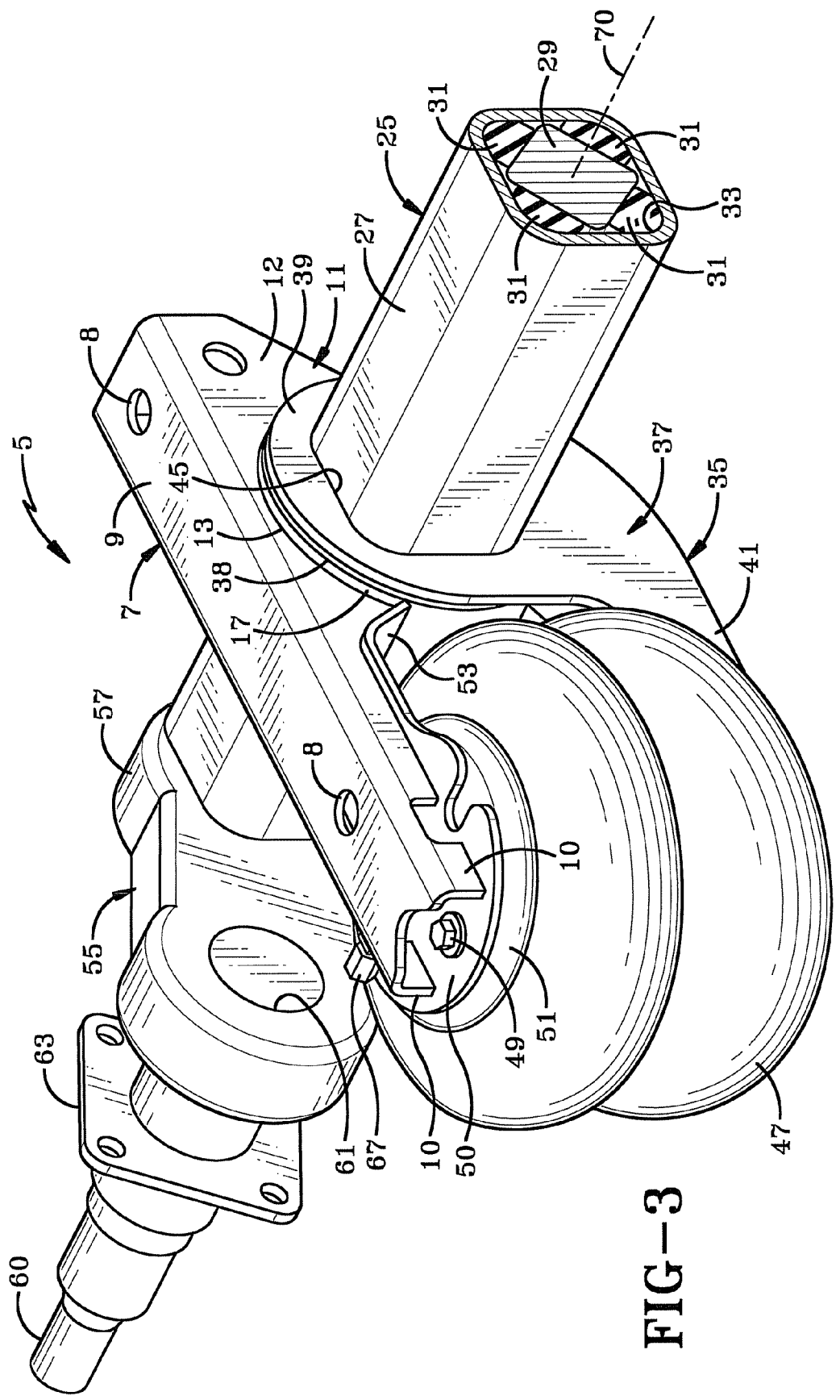
FIG. 3 is a perspective view of the improved vehicle suspension assembly of the present invention.

A vehicle suspension system having the improved suspension assembly of the present invention is indicated generally at 1, and is shown particularly in FIGS. 3-9 mounted a vehicle 2, such as a trailer of the type being towed by a tractor 3. Trailer 2 is supported on a pair of frame rails 4 extending longitudinally along a length of the trailer. A pair of the improved suspension assemblies, each indicated generally at 5, is mounted on a respective frame rail 4 generally adjacent a wheel 6. Suspension assembly 5 as shown in FIG. 3, includes a frame mounting bar 7 which is secured to one of the trailer frame rails 4 by a plurality of bolts which extend through holes 8, by welding or other types of attachments. Frame bar 7 preferably has a U-shaped channel configuration with web wall 9 and a pair of spaced legs 10 terminating in depending end flange portion 11 (FIG. 8) formed by a pair of spaced flange legs 12. Each flange leg 12 is formed with a generally semicircular cutout 13 and has a plurality of reinforcing gussets 15 extending between each of the flange legs 12.

Figure 1:
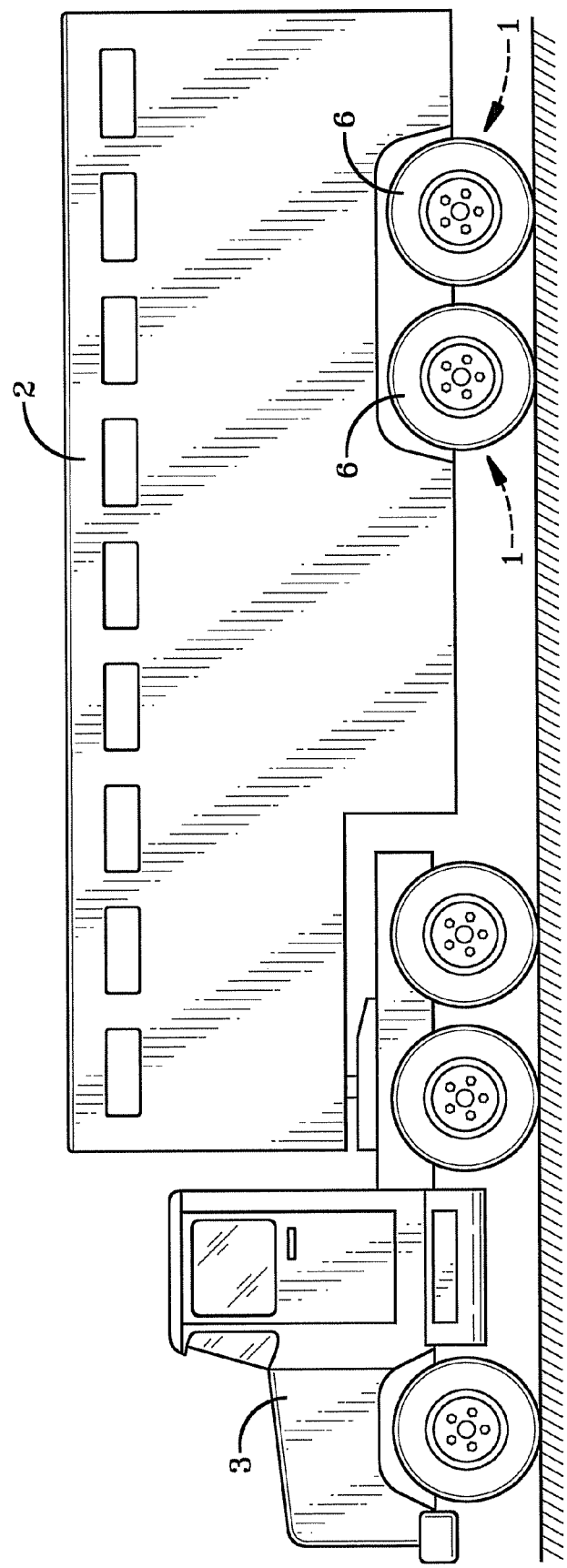
FIG. 1 is a diagrammatic side elevational view of a vehicle trailer on which the improved suspension assembly is mounted.
Figure 2:
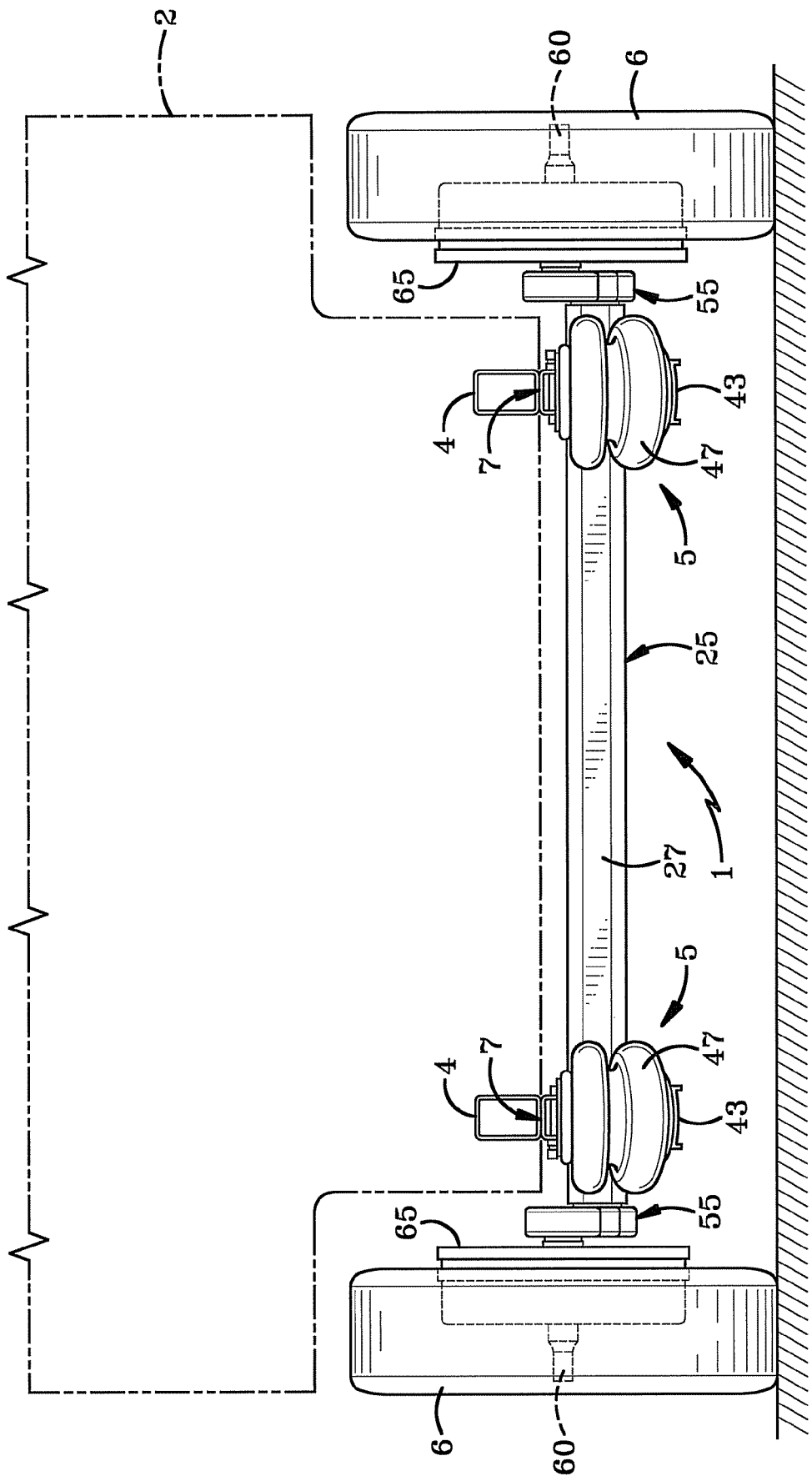
FIG. 2 is a rear elevational view of a pair of the improved suspension assemblies mounted on a trailer shown in dot dashed lines.

An annular collar 17 is secured by welds 19 within cutout 13 (FIG. 9) and receives a bushing 21 therein in which is mounted a plurality of metal spacers 23 which are secured to a torsion axle indicated generally at 25, by welds 26 or other attachment means. Torsion axle 25 extends between a pair of the improved suspension assemblies as shown particularly in FIG. 2, and includes a generally square-shaped outer tube 27 and an inner stub shaft 29 at each end thereof. Stub shaft 29 is movably rotatably mounted within outer tube 27 by a plurality of elastomeric strips or bars 31 (FIG. 3) which are press-fitted within the hollow interior 33 of tube 27, resiliently supporting stub shaft 29 therein. Torsion axle or first reaction member 25 is similar to a well-known torsion axle, one type being sold under the trademark TOR FLEX® from Dexter Axle.

Suspension assembly 5 further includes an air spring support arm or second reaction member, indicated generally at 35, which includes a pair of spaced support arm members 37, each of which has a generally L-shaped configuration with a circular mounting leg 39 and an elongated leg 41 extending outwardly angularly therefrom. A pair of washers 38 is located between arms 37 and collar 17 and bushing 21 to provide for a smooth sliding engagement therebetween. The outer distal ends of legs 41 are connected by an air spring mounting plate 43 extending therebetween and preferably welded thereto. Each support arm 37 is formed with a square-shaped opening 45 complementary to axle tube 27 for slidably receiving axle tube 27 therethrough where it is secured to legs 37 by welding or other attachment means at the pivot.

Figure 4:
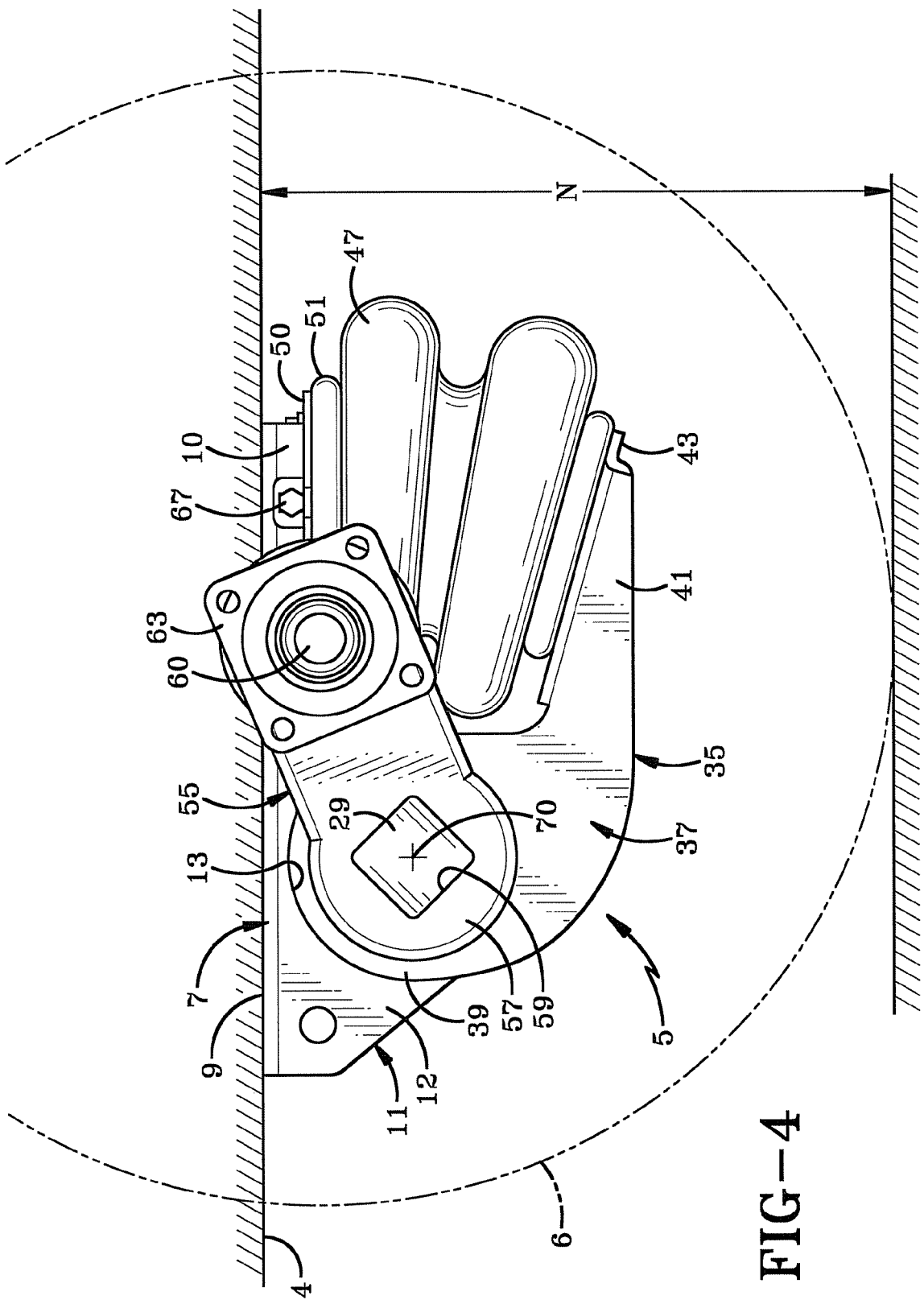
FIG. 4 is a side elevational view of the suspension assembly mounted on a vehicle with a ground engaging tire shown in dot dashed lines.
Figures 7, 8:
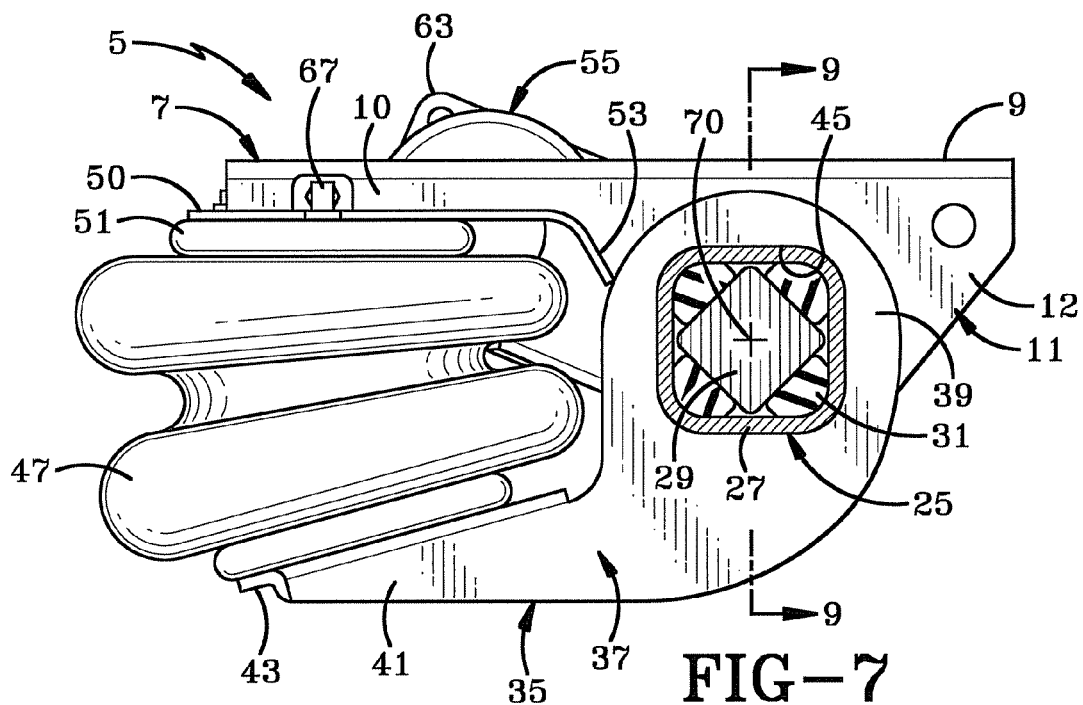
FIG. 7 is a side elevational view of the suspension assembly with the torsion axle shown in cross section.
FIG. 8 is an enlarged sectional view taken on line 8-8, FIG. 5.
Figure 9:
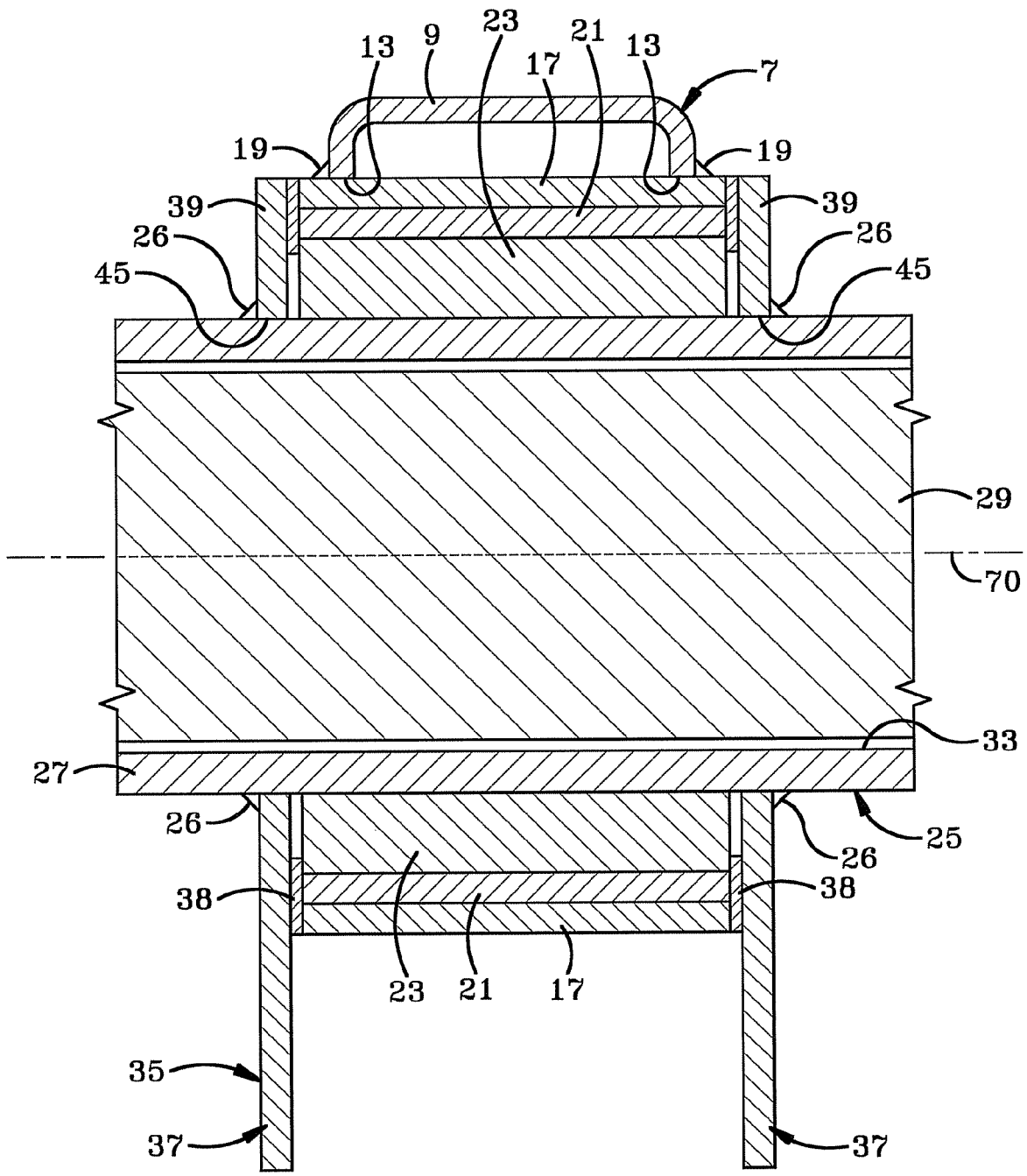
FIG. 9 is a greatly enlarged sectional view taken on line 9-9, FIG. 7.

An air spring 47 is secured to mounting plate 43 by a plurality of bolts 48 (FIG. 8) and at its upper end by bolts 49 to an irregularly shaped plate 50 which as best shown in FIGS. 3 and 8. Plate 50 is secured to the top end plate 51 of air spring 47 by bolts 49, lugs or other attachment means and extends beneath and is welded to the bottom edges of legs 10 of U-shaped flange mounting bars 7. Plate 50 terminates in a curved end flange portion 53 (FIG. 8) which terminates adjacent axle collar 17. A spindle arm indicated generally at 55, is attached at one end 57 to stub shaft 29 preferably by welding, after the stub shaft extends through a complementary-shaped square opening 59 formed in spindle arm end 57 (FIG. 4). The opposite end of spindle arm 55 is formed with a circular opening 61 (FIG. 3) in which one end of a spindle 60 is secured preferably by welds. A brake assembly mounting plate 63 is secured to spindle 60 for subsequent attachment to a brake assembly shown diagrammatically in FIG. 2. Spindle 60 supports a wheel/hub assembly in a manner well known in the art.

In accordance with the main feature of the invention as shown in FIGS. 3-9, an axis 70 which extends through the center of torsion axle 25 and stub shaft 29 is coaxial with the axis about the pivot axis of air spring support arm 35. Thus, both the pivot axis for the air spring mounting arm and the center axis of torsion axle 25 are coaxial or are the same axis as opposed to the spaced axes for the air spring mounting arm and torsion axle of U.S. Pat. No. 6,340,165. This provides for a considerably more compact, lighter weight air spring torsion bar assembly, which has a reduced number of components and a considerably shorter air spring mounting arm and frame mounting bar than the suspension assembly of the above-discussed U.S. Pat. No. 6,340,165.

Figure 5:
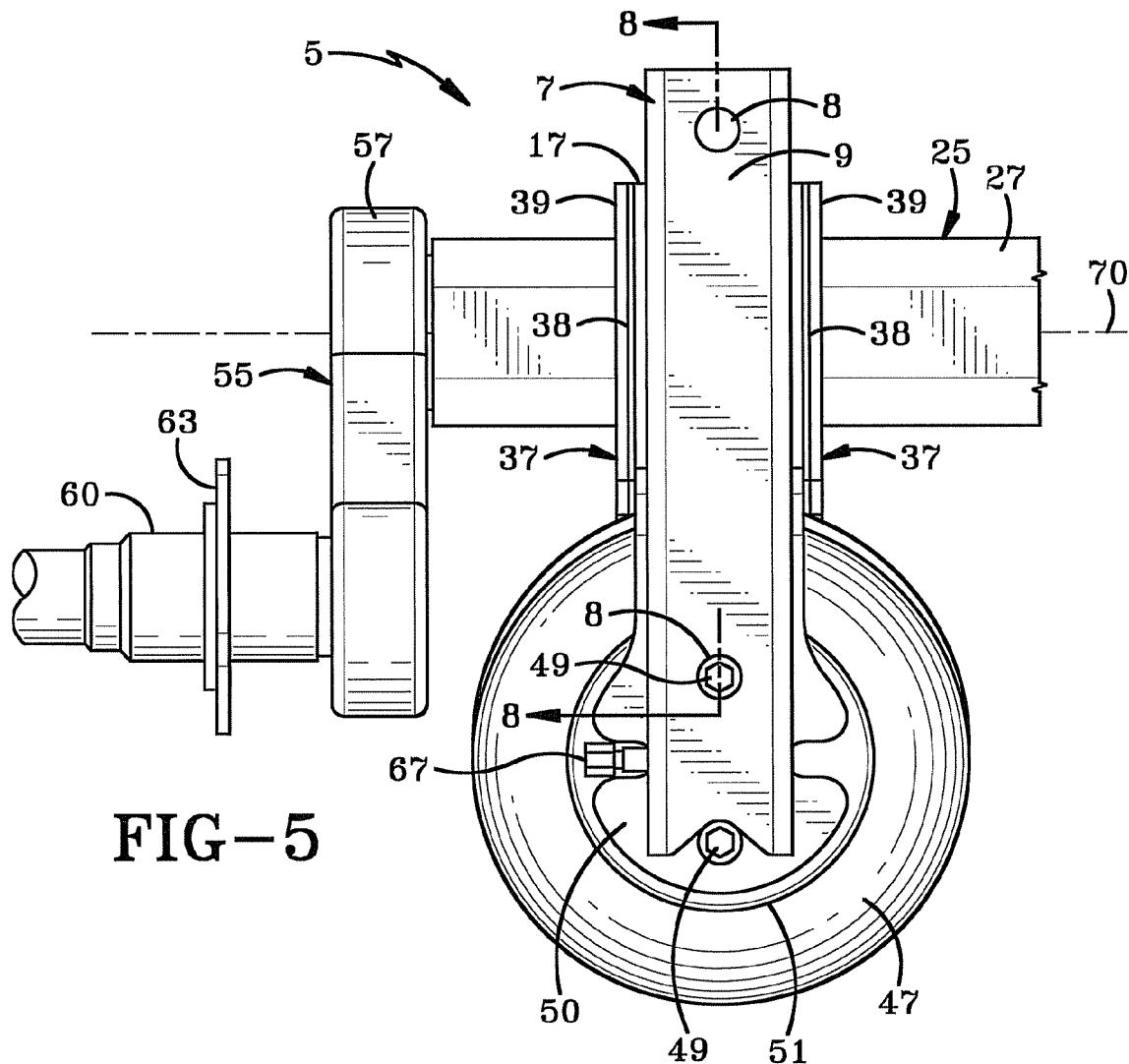
FIG. 5 is a top plan view of the improved vehicle suspension assembly.
Figure 6:
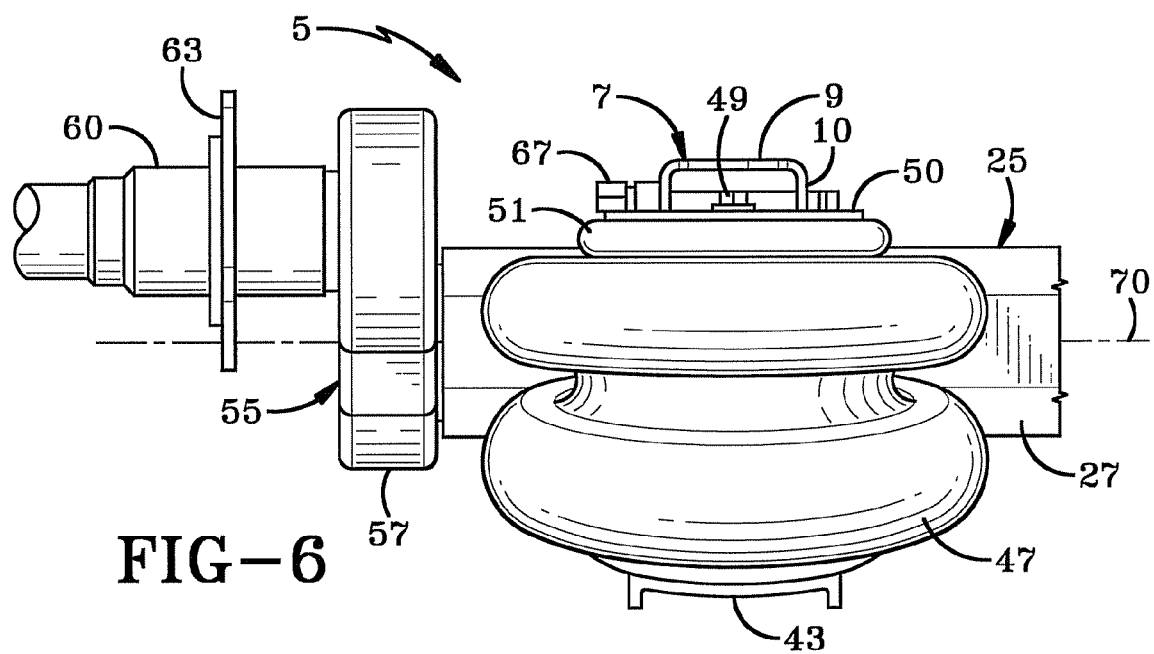
FIG. 6 is a rear elevational view of the suspension assembly of FIG. 5.

Air spring 47 is shown as a double convolute air spring, but could be a triple convolute or rolling lobe air spring without affecting the concept of the invention. Furthermore, the air spring can use other internal fluids rather than air for its operation, although air is the preferred fluid which is supplied thereto from a compressor (not shown) usually mounted within the tractor or trailer and connected to a coupler 67 on the air spring by a air line (not shown). Coupler 67 is mounted on top end plate 51 of the air spring as shown in FIG. 6. Furthermore, the coaxial arrangement of the air spring mounting arm and torsion axis provides for a shorter air spring mounting arm and enables the center line of the air spring to be generally in alignment or slightly beyond the axis of spindle 60 as shown in FIG. 5. This again provides for a more compact, sturdy air suspension assembly than the prior art combination air spring and torsion axle suspension assembly.

Figure 10:
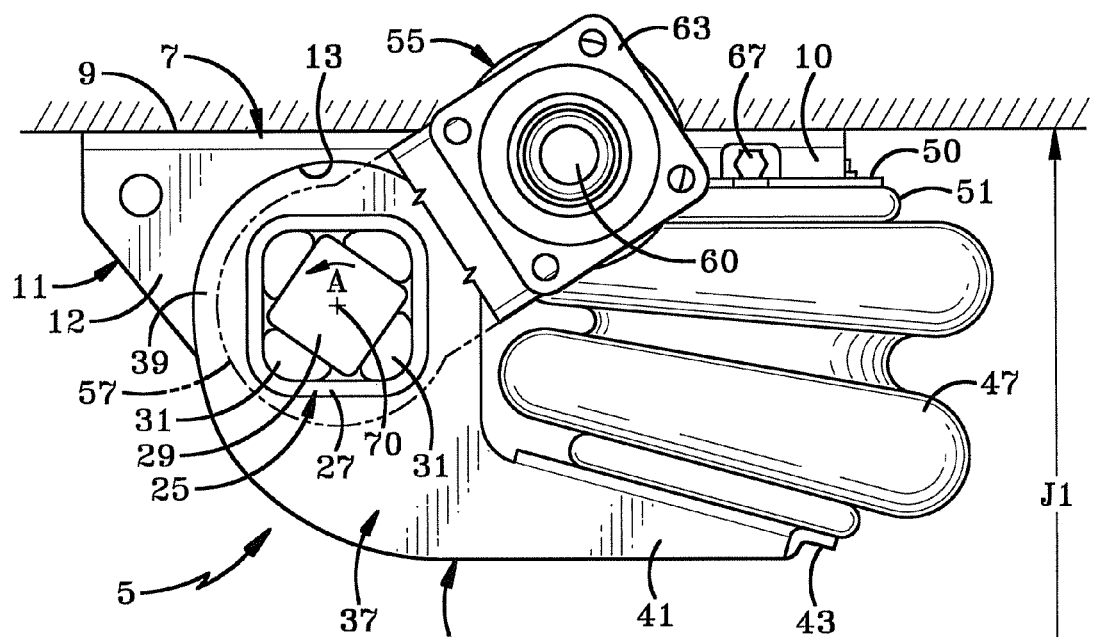
FIG. 10 is a side elevational view of the vehicle suspension assembly at the start of a jounce movement.
Figure 11:
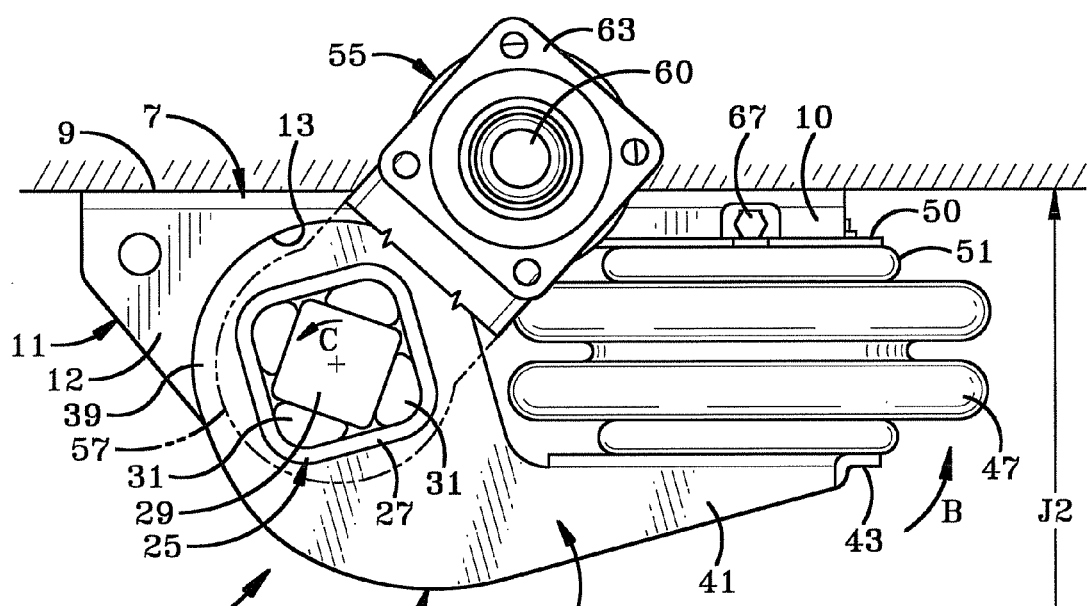
FIG. 11 is a view similar to FIG. 10 with the vehicle suspension assembly moving toward a full jounce position.
Figure 12:
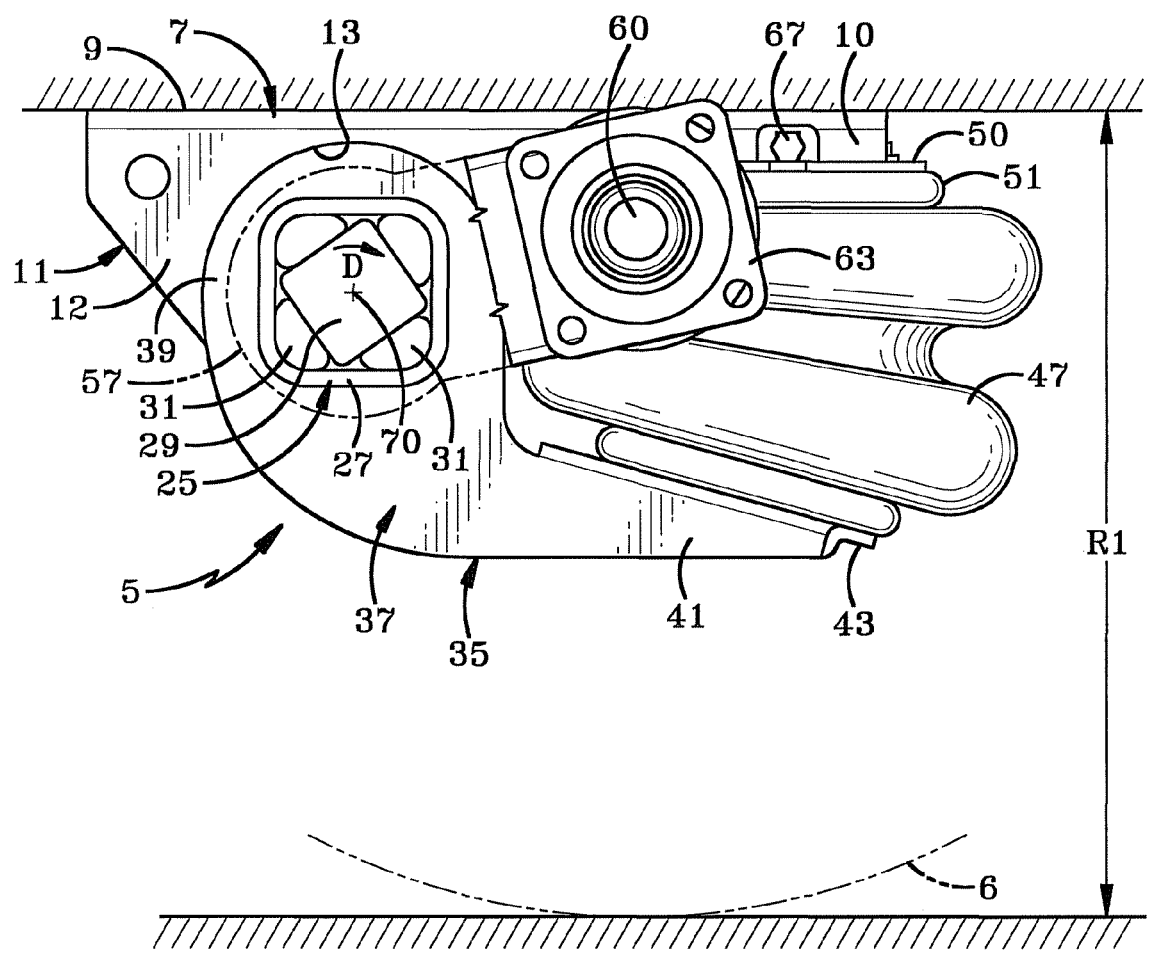
FIG. 12 is a view similar to FIGS. 10 and 11 with the vehicle suspension assembly starting to move toward the rebound direction.
Figure 13:
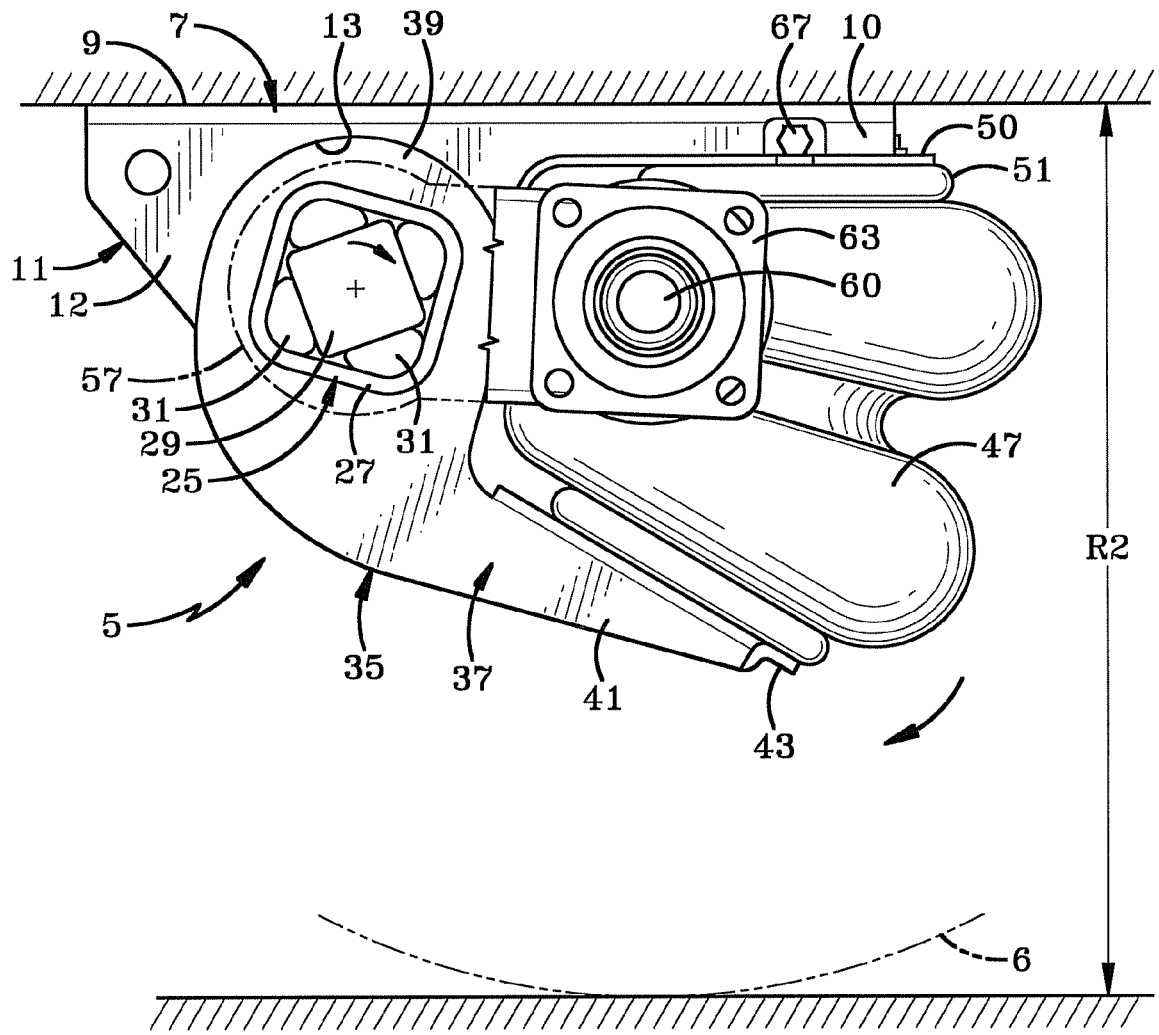
FIG. 13 is a view similar to FIGS. 10-12 with the vehicle suspension assembly in the full rebound position.

The manner of operation of suspension assembly 5 is best shown in FIGS. 10-13. FIG. 10 shows the position of the air spring and mounting arm at the start of a jounce movement. FIG. 11 shows both the torsion axle, and in particular stub shaft 29 and the air spring in a nearly full jounce position as shown by the counterclockwise pivotal movement of air spring support arm 35 in the direction of Arrow B and the rotational movement of stub shaft 29 in the direction of Arrow C. FIG. 12 shows the start of the rebound of the suspension assembly with the initial rebound force being absorbed by elastomeric strips or bars 31 as shown by the clockwise rotation of stub shaft 29 (Arrow D). FIG. 13 shows the full rebound position where both stub shaft 29 and its associated elastomeric strips or bars 31 and air spring 47 provide the desired stability to the suspension assembly by absorbing the various twisting and up and down or side to side movement exerted on the trailer wheels. Since the rubber torsion spring system of the present invention is in series with the air spring system with any load applied to the system and since each spring is in the path of the forces being applied and each spring deflects in inverse proportion to its spring rate, the softer of the springs deflects more than the stiffer of the springs. Thus, the total effective spring rate is therefore softer than the spring rate of either of the springs alone, and both springs deflect at the very same time As is also evident from review of the figures, that inasmuch as axis 70 extends through the center of torsion axle 25 and stub shaft 29 is coaxial with the axis about the pivot axis of air spring support 35, torsion axle 25 does not translate either vertically or horizontally, but rather only receives true rotational forces as a result of any input force from the tire wheel assemblies through spindle 60 and spindle arms 55. Moreover, by assuring that torsion axle 25 sees no translational movement in either of the vertical or horizontal plane, significantly lower stresses are felt by support arms 35 and torsion axle 25 thereby providing a smaller more lightweight, as well as more reliable suspension system.

As should also be evident from review of the drawings, the free ends of torsion axle 25 will remain positioned relative to one another in the vertical plane as a result of their being affixed to the respective suspension frames with the respective flange mounting bars 7. Conversely, torsion axle 25 which is positioned along the respective support arms 35 will provide movement between the free ends of torsion axle 25 because movement of support arms 25 will necessarily cause movement of the free end of the associated end of torsion axle 25. Additionally, inasmuch as the torsion axle and air springs both react colinearly at a common pivot axis, it should be understood that each of these reaction members react to forces input through the spindle in series rather than parallel.

A pneumatic or hydraulic shock absorber could extend between air spring support arms 35 and mounting bar 7 or trailer frame 4 to assist in absorbing forces exerted on the vehicle wheels but is not essential for the operation of the present invention.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A vehicle suspension assembly for use with a vehicle having a frame comprising:
    a first frame adapted to be connected to the vehicle frame;
    a first air spring support arm pivotally mounted on the first frame having a pivot axis;
    a load path along which a load passing into the front frame travels;
    a torsion axle positioned along the load path with a torsion axle axis mounted on the first frame, wherein the pivot axis and the torsion axle axis are co-axial;
    a first air spring positioned along the load path attached intermediate the first frame and the air spring support arm spaced from the axis; and,
    wherein the torsion axle and the first air spring are part of the load path whereby the torsion axle and the first air spring are adapted to react to the load in series; and
    wherein a spindle arm is attached to an inner shaft of the torsion axle having a spindle pivot axis; and in which a wheel spindle is attached to a distal end of the spindle arm is attached co-axial with the torsion axle such that the pivot axis, torsion axle axis and spindle pivot axis are all co-axial.

2. The vehicle suspension assembly defined in claim 1 wherein the torsion axle has a hollow outer tube and the inner shaft and at least one elastomeric member mounted intermediate the outer tube and the inner shaft.

3. The vehicle suspension assembly defined in claim 2 wherein the outer tube of the torsion axle has multiple flat sides; and in which the air spring support arm includes a pair of spaced arm members having aligned openings formed therein for receiving the outer tube of the torsion axle therethrough.

4. The vehicle suspension assembly defined in claim 3 wherein the shape of the openings in the spaced arm members is complementary to the exterior configuration of the outer tube.

5. The vehicle suspension assembly defined in claim 2 wherein the shaft has a rectangular cross section; and in which four elastomeric members are located between flat sides of the shaft and the interior of the outer tube of the torsion axle.

6. The vehicle suspension assembly defined in claim 1 wherein the torsion axle includes an outer tube; in which the air spring support arm is pivotally mounted on the first frame by an axle collar secured to the frame; in which an inner bushing is mounted within said axle collar; and in which at least one contoured spacer is mounted between said inner bushing and the torsion axle.

7. The vehicle suspension assembly defined in claim 1 wherein a pair of spacer washers is mounted between the air spring support arm and the first frame.

8. The vehicle suspension assembly defined in claim 1 wherein the air spring support arm includes a pair of spaced arm members each of which has a generally L-shaped configuration with a first leg attached to the torsion axle and a second leg supporting the air spring.

9. The vehicle suspension assembly defined in claim 8 wherein an air spring support plate extends between distal ends of the second legs of the air spring arm members.

10. The vehicle suspension system as defined in claim 1 further comprising:
    a second frame adapted to be attached to the vehicle frame;
    a second air spring support arm pivotally mounted on the second frame whereby the second air spring support arm has the same pivot axis as the first air spring's pivot arm; and
    a second air spring attached intermediate the second frame and the second air spring support arm.

11. The vehicle suspension system as defined in claim 10 in which the first air spring support arm has a first pivot and the second air spring support arm has a second pivot, each of the first and second pivots having the same pivot axis; and in which the torsion axle has a center axis and in which the center axis and the pivot axis are collinear.

12. A suspension system for use with a vehicle having a frame comprising:
    a first frame adapted to attach to the vehicle frame;
    a first reaction member carried by the first frame and including a first axis;
    a second reaction member including a pivot axis connected to the first frame whereby translational movement of the second reaction member causes only rotational movement of the first reaction member;
    and
    wherein a load is first received at the first reaction member before the load is serially transferred to the second reaction member; and
    wherein a spindle arm is attached to an inner shaft of the first reaction member having a spindle pivot axis; and in which a wheel spindle is attached to a distal end of the spindle arm is attached co-axial with the first reaction member such that the pivot axis, first axis and spindle pivot axis are all co-axial.

13. The suspension system as defined in claim 12 in which the first reaction member is a torsion axle.

14. The suspension system as defined in claim 13 in which the second reaction member is an air spring.

15. The suspension system as defined in claim 12 in which the second reaction member has a top and a bottom, and in which the bottom of the second reaction member translates horizontally.

16. The suspension system as defined in claim 12 in which the second reaction member has a top and a bottom, and in which the bottom of the second reaction member translates vertically.

17. The suspension system as defined in claim 12 further comprising:

an air spring support arm having a first end and a second end;

in which the air spring is supported on the second end; and a pivot is carried by the first end whereby the pivot and the first axis are coaxial.

18. The suspension system as defined in claim 12 in which the first reaction member and the second reaction member react to forces in series.

19. The vehicle suspension assembly defined in claim 1 whereby the load path passes through the torsion axle, then through the first air spring and then into the first frame in series.

* * * * *